United States Patent
Cheerla et al.

(10) Patent No.: US 8,465,003 B2
(45) Date of Patent: Jun. 18, 2013

(54) PLUMBING FIXTURE MADE OF BISMUTH BRASS ALLOY

(75) Inventors: Mahesh K. Cheerla, Howell, MI (US); Robert O. Learmont, Howell, MI (US)

(73) Assignee: Brasscraft Manufacturing Company, Novi, MI (US)

( * ) Notice: Subject to any disclaimer, the term of this patent is extended or adjusted under 35 U.S.C. 154(b) by 137 days.

(21) Appl. No.: 13/218,553

(22) Filed: Aug. 26, 2011

(65) Prior Publication Data

US 2013/0048899 A1  Feb. 28, 2013

(51) Int. Cl.
*F16K 51/00* (2006.01)

(52) U.S. Cl.
USPC ........... 251/366; 251/368; 420/469; 420/477; 420/499

(58) Field of Classification Search
USPC ............................ 251/368; 420/469, 477, 499
See application file for complete search history.

(56) References Cited

U.S. PATENT DOCUMENTS

| | | | |
|---|---|---|---|
| 3,770,243 A * | 11/1973 | Zell et al. ................. | 251/366 |
| 4,879,094 A * | 11/1989 | Rushton .................... | 420/476 |
| 5,137,685 A * | 8/1992 | McDevitt et al. ........... | 420/477 |
| 5,147,469 A | 9/1992 | Kanzaki et al. | |
| 5,286,444 A | 2/1994 | Tomikawa et al. | |
| 5,288,458 A | 2/1994 | McDevitt et al. | |
| 5,409,552 A | 4/1995 | McDevitt et al. | |
| 5,494,259 A * | 2/1996 | Peterson .................. | 251/368 |
| 5,508,125 A | 4/1996 | Bantz et al. | |
| 5,544,859 A * | 8/1996 | Coltrinari et al. .......... | 251/368 |
| 5,565,045 A | 10/1996 | Caron et al. | |
| 5,637,132 A | 6/1997 | Matthews et al. | |
| 5,637,160 A | 6/1997 | Brock et al. | |
| 5,942,056 A | 8/1999 | Singh | |
| 6,059,901 A | 5/2000 | Sahu | |
| 6,063,480 A | 5/2000 | Hokazono et al. | |
| 6,103,188 A | 8/2000 | Guixa Arderiu et al. | |
| 6,372,061 B1 | 4/2002 | Hatano et al. | |
| 6,413,330 B1 | 7/2002 | Oishi | |
| 6,599,378 B1 | 7/2003 | Hagiwara et al. | |
| 6,645,427 B1 | 11/2003 | Kardokus et al. | |
| 6,652,675 B2 | 11/2003 | Sakai et al. | |
| 6,858,102 B1 | 2/2005 | Kardokus et al. | |
| 6,949,150 B2 | 9/2005 | Sugawara et al. | |
| 6,974,509 B2 | 12/2005 | Hagiwara et al. | |
| 7,056,396 B2 | 6/2006 | Oishi | |
| 7,261,760 B2 | 8/2007 | Ishida et al. | |
| 7,297,215 B2 | 11/2007 | Kurose et al. | |
| 7,608,157 B2 | 10/2009 | Oishi | |
| 7,678,173 B2 | 3/2010 | Yokota et al. | |
| 7,695,578 B2 | 4/2010 | Horigome et al. | |
| 7,776,163 B2 | 8/2010 | Xu et al. | |
| 7,806,996 B2 | 10/2010 | Kurose et al. | |
| 7,819,992 B2 | 10/2010 | Yamamoto et al. | |
| 7,883,588 B2 | 2/2011 | Yokota et al. | |
| 7,883,589 B2 | 2/2011 | Oishi | |
| 7,909,946 B2 | 3/2011 | Oishi | |

(Continued)

*Primary Examiner* — John Bastianelli
(74) *Attorney, Agent, or Firm* — Carlson, Gaskey & Olds, P.C.

(57) ABSTRACT

A plumbing fixture includes a plumbing fixture body having a composition of, by weight percentage, 58-63 of copper, 0.8-1.5 of bismuth, 0.05-0.15 of phosphorous, and a remainder of zinc and any impurities. The plumbing fixture body includes a first opening and a second opening that are arranged to communicate a fluid there through. The first opening defines a first inner diameter $D_1$ and the second opening defines a second inner diameter $D_2$ such that a ratio of $D_1/D_2$ is 1.05-2.3.

13 Claims, 4 Drawing Sheets

U.S. PATENT DOCUMENTS

2002/0110478 A1* 8/2002 Lawrence ..................... 420/476
2004/0234412 A1 11/2004 Oishi et al.
2005/0092401 A1 5/2005 Oishi
2010/0147247 A1* 6/2010 Qiao et al. ..................... 251/368

* cited by examiner

PLUMBING FIXTURE MADE OF BISMUTH BRASS ALLOY

BACKGROUND

This disclosure relates to plumbing fixtures. Plumbing fixtures are known and used as fittings, valves, and the like. In general, brass alloys are used to manufacture plumbing fixtures for aesthetics, relatively low friction compared to other metallic alloys, or relatively low hardness in comparison to other metallic alloys. A typical brass alloy composition includes copper, zinc, and lead, which is used to soften the alloy for adequate formability. The lead can be excluded from the alloy and replaced by lead-replacement elements to maintain roughly the same formability, but the exclusion of lead and the inclusion of lead-replacement elements detrimentally change other properties of the alloy and render the alloy unsuitable for plumbing fixtures.

SUMMARY

Disclosed is a plumbing fixture that includes a plumbing fixture body having a composition of, by weight percentage, 58-63 of copper, 0.8-1.5 of bismuth, 0.05-0.15 of phosphorous, and a remainder of zinc and any impurities. The plumbing fixture body includes a first opening and a second opening that are arranged to communicate a fluid there between. The first opening defines a first inner diameter $D_1$ and the second opening defines a second inner diameter $D_2$ such that a ratio of $D_1/D_2$ is 1.05-2.3.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
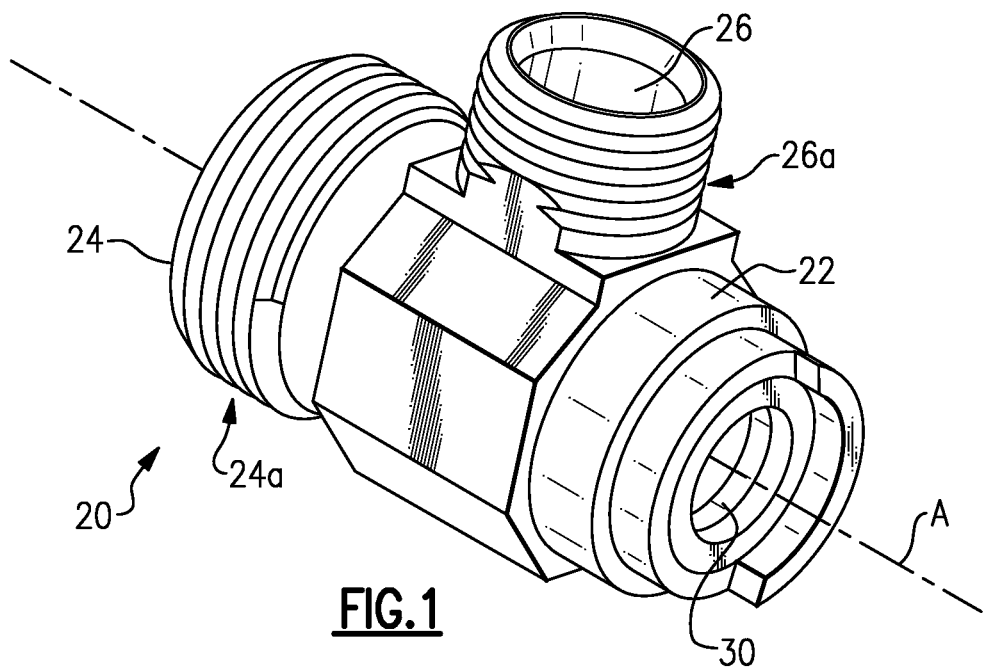
FIG. 1 shows a perspective view of an example plumbing fixture.

FIG. 1 schematically illustrates a perspective view of an example plumbing fixture 20. In this example, the plumbing fixture 20 is a valve for controlling water flow in a plumbing system. It is to be understood, however, that this disclosure is not limited to the design shown and the examples herein may be applied to other types of plumbing fixture designs or valves. As will be described in more detail, the plumbing fixture 20 is fabricated from a lead-free, bismuth brass alloy and has a ratio of certain dimensions defined by the plumbing fixture 20 to ensure proper function of the fixture in its intended end use.

In the illustrated example, the plumbing fixture 20 includes a plumbing fixture body 22. The plumbing fixture body 22 can be formed into a desired shape using any suitable technique. In one example, the plumbing fixture body 22 is a monolithic bismuth brass piece (free of joints) that is formed from an extruded brass rod. In one example, the plumbing fixture body 22 is manufactured according to processing methods disclosed in co-pending application Ser. No. 13/218,582 (entitled METHOD OF PROCESSING A BISMUTH BRASS ARTICLE).

As indicated above, the plumbing fixture 20 is fabricated from a bismuth brass alloy. The bismuth brass alloy has a composition of, by weight percentage, 58-63 of copper, 0.8-1.5 of bismuth, 0.05-0.15 of phosphorous, and a remainder of zinc and any impurities. In a further example, the impurities include, by weight percentage, up to 0.001 of cadmium, up to 0.5 of iron, up to 0.09 of lead, up to 0.1 of silicon, up to 0.5 of tin, and up to 0.5 of any other impurity elements. In a further example, the compositions above include, by weight percentage, 0.8-1.45 of the bismuth. In another example, the compositions above include, by weight percentage, 0.8-1.2 of the bismuth.

Although the bismuth increases machinability of the given bismuth brass alloy compositions, it can also increase the susceptibility of the plumbing fixture 20 to cracking. Thus, the given amount of bismuth in the composition is selected to increase machinability but limit susceptibility to cracking. The use of lead-free, bismuth brass alloy in combination with the ratios later described herein, provides a crack-free plumbing fixture 20 that ensures proper function.

Figure 2:
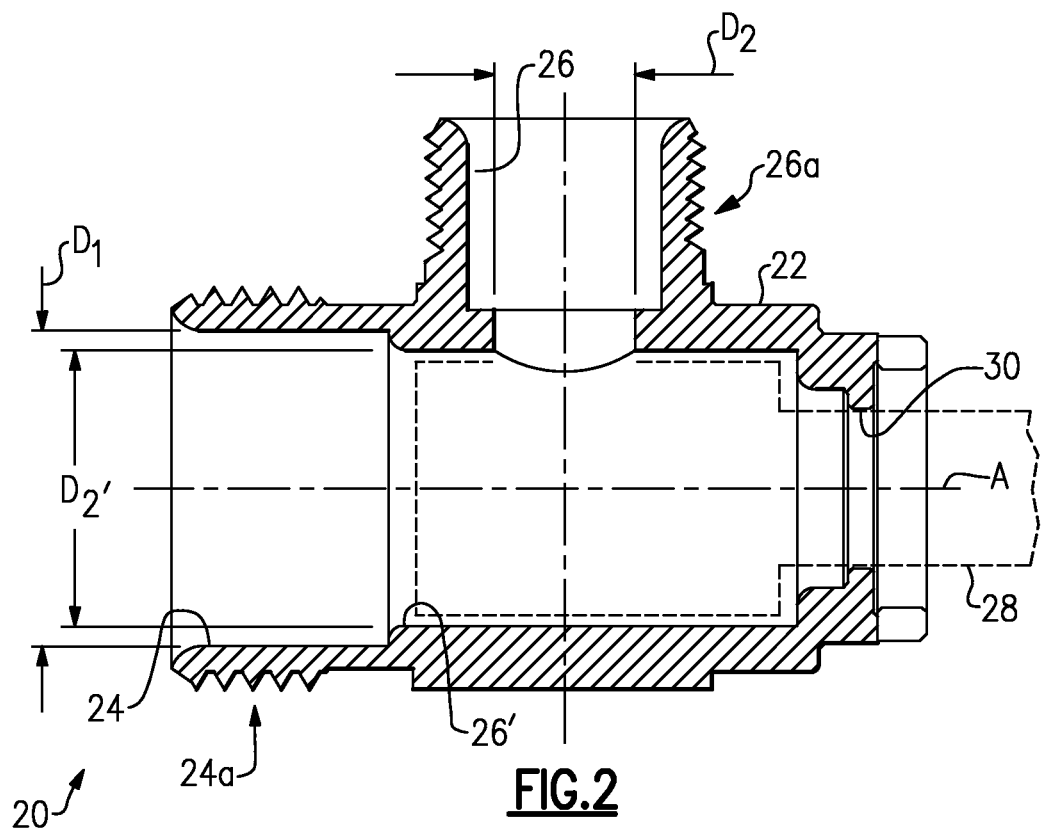
FIG. 2 shows a cross-sectional view of the plumbing fixture shown in FIG. 1.

FIG. 2 shows a cross-sectional view of the plumbing fixture 20 shown in FIG. 1. As shown, the plumbing fixture body includes a first opening 24 and a second opening 26 that are arranged to communicate a fluid there between. A valve member 28 (shown schematically) is arranged within the plumbing fixture body 22 to control fluid flow between the first opening 24 and the second opening 26. In some examples, the valve member 28 is a valve that has an actuator that extends through a third opening 30 in the plumbing fixture body 22. Thus, the third opening 30 is not used to communicate fluid, but rather houses a portion of the valve member 28.

The first opening 24 defines a first inner diameter $D_1$ and the second opening 26 defines a second inner diameter $D_2$ such that a ratio of $D_1/D_2$ (the first inner diameter divided by the second inner diameter) is 1.05-2.3.

The plumbing fixture body 22 also defines another opening 26', which for purposes of this disclosure is also termed a second opening in the plumbing fixture 20. The second opening 26' is an internal opening within the plumbing fixture body 22. The second opening 26' defines a second inner diameter $D_2'$. In this example, the ratio of $D_1/D_2'$ is also 1.05-2.3. In a further example, the ratio of $D_1/D_2'$ is non-equivalent or less than the ratio of $D_1/D_2$ and is 1.05-1.6.

In a further example, the one or both of the ratios described above is 1.1-2.1. In another embodiment, one or both of the ratios described above is 1.62-1.65. In another example, one or both of the ratios described above is 1.05-1.6. In yet another embodiment, one or both of the ratios described above is 1.08-1.10. The given ratios ensure proper flow of fluid between the first opening 24 and the second opening 26.

In the illustrated arrangement, the first opening 24 and the second opening 26 are non-coaxially arranged and the first opening 24 and the second opening 26' are coaxially arranged with regard to central axis A. The third opening 30 is coaxially arranged with the first opening 24 and the second opening 26', and is non-coaxially arranged with regard to the second opening 26.

In the illustrated example, the first opening 24 has a threaded outer diameter 24a for securing a nut over the first opening 24 to attach the plumbing fixture 20 to a mating tube. Likewise, the second opening 26 has a threaded outer diameter 26a for also securing another nut over the second opening 26 to attach the plumbing fixture 20 to another mating tube. The third opening 30 does not include a threaded outer diameter or a threaded inner diameter.

Figure 3:
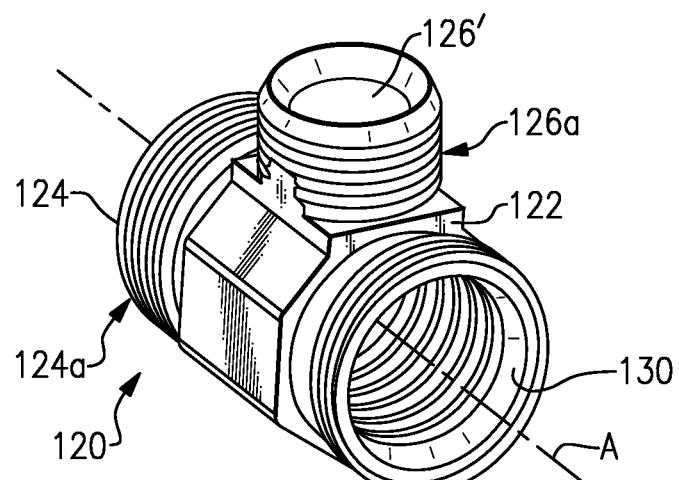
FIG. 3 shows a perspective view of another example plumbing fixture.
Figure 4:
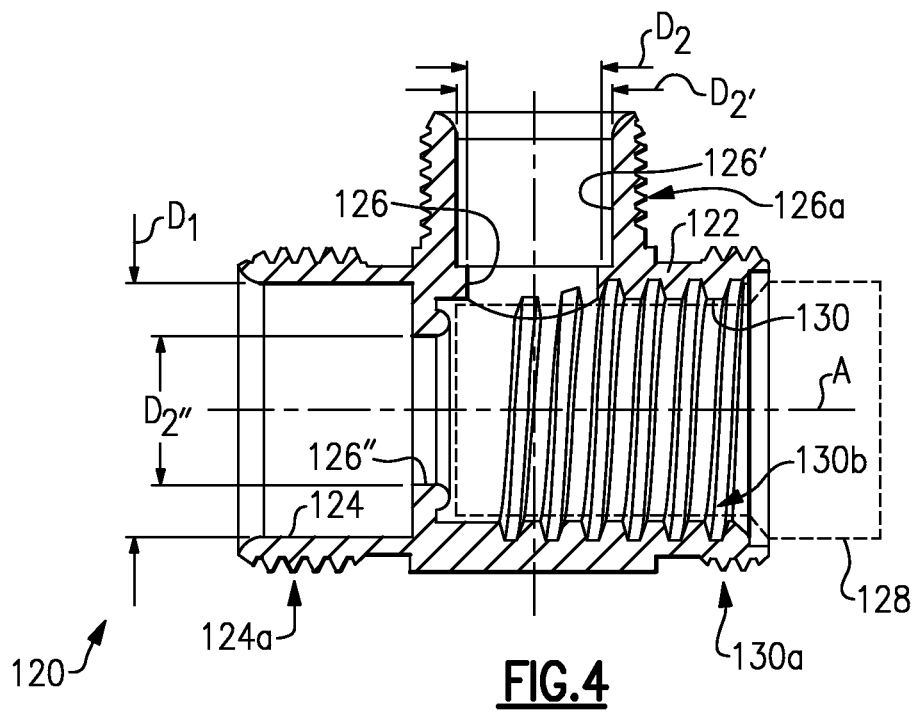
FIG. 4 shows a cross-sectional view of the plumbing fixture shown in FIG. 3.

FIG. 3 shows a perspective view of another embodiment of a plumbing fixture 120, and FIG. 4 shows a cross-sectional view of the plumbing fixture 120 shown in FIG. 3. In this disclosure, like reference numerals designate like elements where appropriate and reference numerals with the addition of one-hundred or multiples thereof designate modified elements that are understood to incorporate the same features and benefits of the corresponding elements.

In this example, the plumbing fixture 120 includes a plumbing fixture body 122 that has a first opening 124 and a second opening 126 that are arranged to communicate a fluid there between. In this example, the second opening 126 is an internal opening within the plumbing fixture body 122. A valve member 128 (shown schematically) is arranged within the plumbing fixture body 122 to control fluid flow between the first opening 124 and the second opening 126. The valve member 128 extends through a third opening 130 in the plumbing fixture body 122. The third opening 130 is not used to communicate fluid, but rather houses a portion of the valve member 128.

The first opening 124 defines a first inner diameter $D_1$ and the second opening 126 defines a second inner diameter $D_2$ such that a ratio of $D_1/D_2$ (the first inner diameter divided by the second inner diameter) is 1.05-2.3 or is within one of the other disclosed ranges described above.

The plumbing fixture body 122 also defines another opening 126', which for purposes of this disclosure is also termed a second opening in the plumbing fixture 120. The second opening 126' defines a second inner diameter $D_2'$. In this example, the ratio of $D_1/D_2'$ is also 1.05-2.3 or is within one of the other disclosed ranges described above. In one example, the ratio $D_1/D_2$ is nonequivalent to the ratio $D_1/D_2'$. In a further example, the ratio of $D_1/D_2'$ is non-equivalent or less than the ratio of $D_1/D_2$ and optionally is 1.62-1.65.

The plumbing fixture body 122 additionally defines another opening 126", which for purposes of this disclosure is also termed a second opening in the plumbing fixture 120. The second opening 126" is an internal opening within the plumbing fixture body 122. The second opening 126" defines a second inner diameter $D_2"$. In this example, the ratio of $D_1/D_2"$ is also 1.05-2.3 or is within one of the other disclosed ranges described above. In one example, the ratios $D_1/D_2$, $D_1/D_2'$ and $D_1/D_2"$ are nonequivalent. In a further example, the ratio of $D_1/D_2"$ is non-equivalent or less than the ratio of $D_1/D_2$ and is optionally 1.1-2.1. In another example the ratio of $D_1/D_2"$ is less than the ratio of $D_1/D_2$, is greater than the ratio of $D_1/D_2'$ and is optionally 1.1-2.1.

In the illustrated arrangement, the first opening 124 is non-coaxial with the second openings 126 and 126'. The second openings 126 and 126' are coaxially arranged, and the first opening 124 and the third opening 130 are coaxially arranged.

In this example, the first opening 124 has a threaded outer diameter 124a and the second opening 126' has a threaded outer diameter 126a. The third opening 130 has a threaded outer diameter 130a and a threaded inner diameter 130b. The threaded outer diameter 130a can receive a nut for securing the valve member 128, and the valve member 128 can include a threaded outer diameter (not shown) to mate with the threaded inner diameter 130b.

Figure 5:
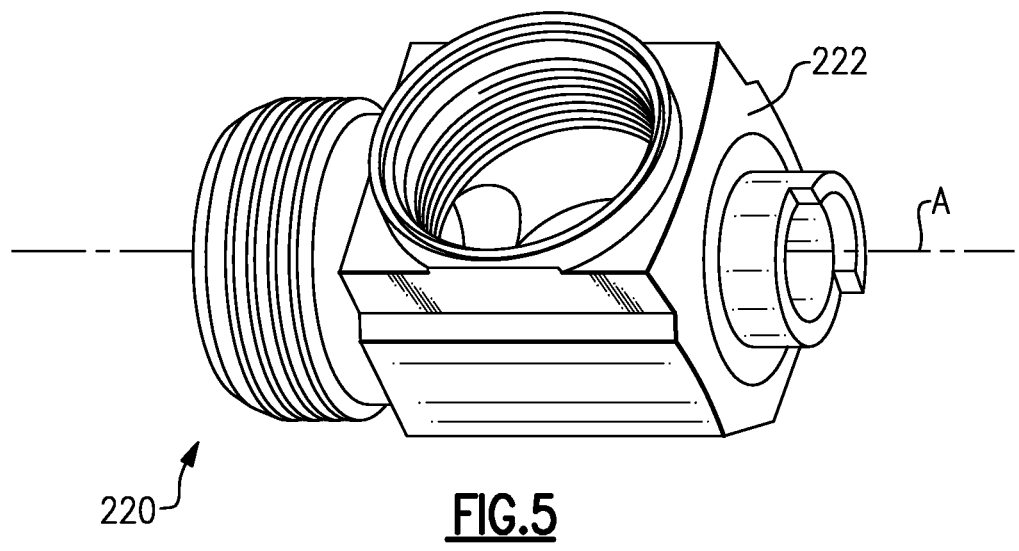
FIG. 5 shows a perspective view of another example plumbing fixture.
Figure 6:
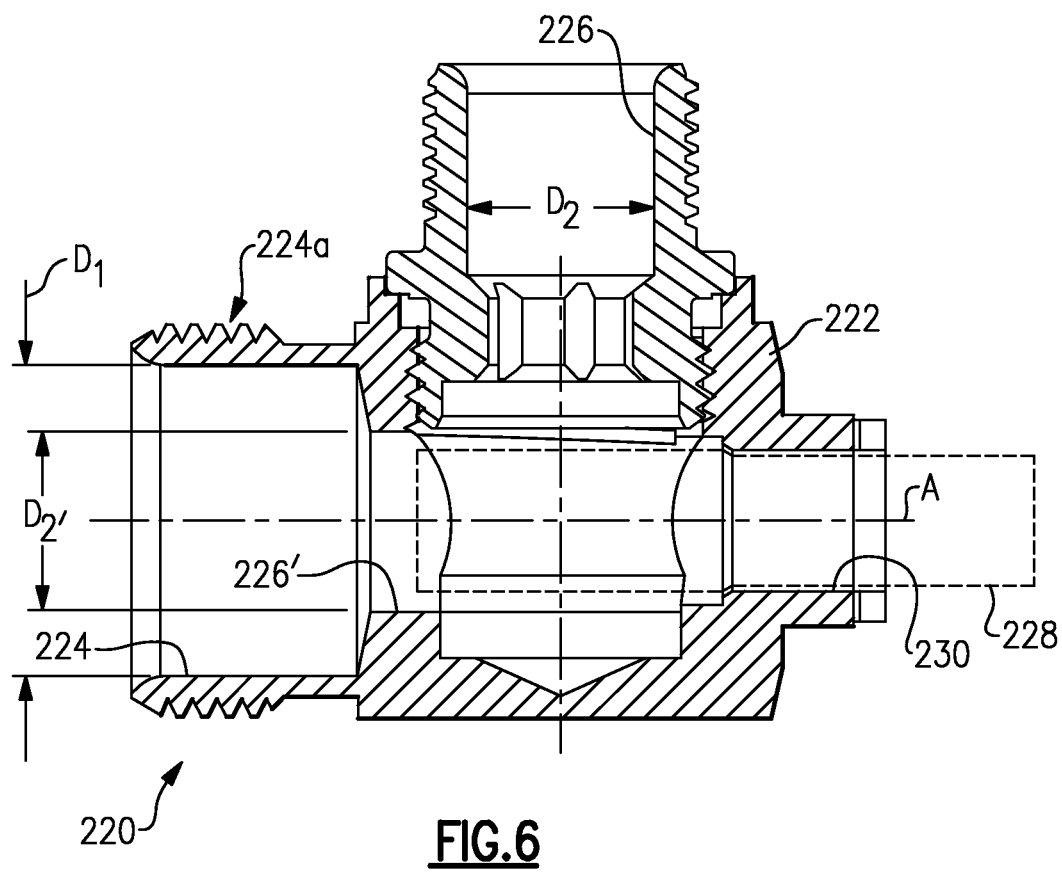
FIG. 6 shows a cross-sectional view of the plumbing fixture shown in FIG. 5.

FIG. 5 shows a perspective view of another embodiment of a plumbing fixture 220, and FIG. 6 shows a cross-sectional view of the plumbing fixture 220 shown in FIG. 5. In this example, the plumbing fixture 220 includes a plumbing fixture body 222 that has a first opening 224 and a second opening 226 that are arranged to communicate a fluid there between. A valve member 228 (shown schematically) is arranged within the plumbing fixture body 222 to control fluid flow between the first opening 224 and the second opening 226. The valve member 228 extends through a third opening 230 in the plumbing fixture body 222. The third opening 230 is not used to communicate fluid, but rather houses a portion of the valve member 228.

The first opening 224 defines a first inner diameter $D_1$ and the second opening 226 defines a second inner diameter $D_2$ such that a ratio of $D_1/D_2$ (the first inner diameter divided by the second inner diameter) is 1.05-2.3 or is within one of the other disclosed ranges described above.

The plumbing fixture body 222 also defines another opening 226', which for purposes of this disclosure is also termed a second opening in the plumbing fixture 220. The second opening 226' is an internal opening within the plumbing fixture body 222. The second opening 226' defines a second inner diameter $D_2'$. In this example, the ratio of $D_1/D_2'$ is also 1.05-2.3 or is within one of the other disclosed ranges described above. In one example, the ratio $D_1/D_2$ is non-equivalent to the ratio $D_1/D_2'$. In a further example, the ratio of $D_1/D_2'$ is non-equivalent or greater than the ratio of $D_1/D_2$ and is optionally 1.1-2.1.

In the illustrated arrangement, the first opening 224 is non-coaxial with the second opening 226 and is coaxial with the second opening 226'. The second opening 226 is non-coaxial with the third opening 230, and the first opening 224 is coaxial with the third opening 230.

In this example, the first opening 224 has a threaded outer diameter 224a. The third opening 230 does not include a threaded outer diameter or a threaded inner diameter.

Figure 7:
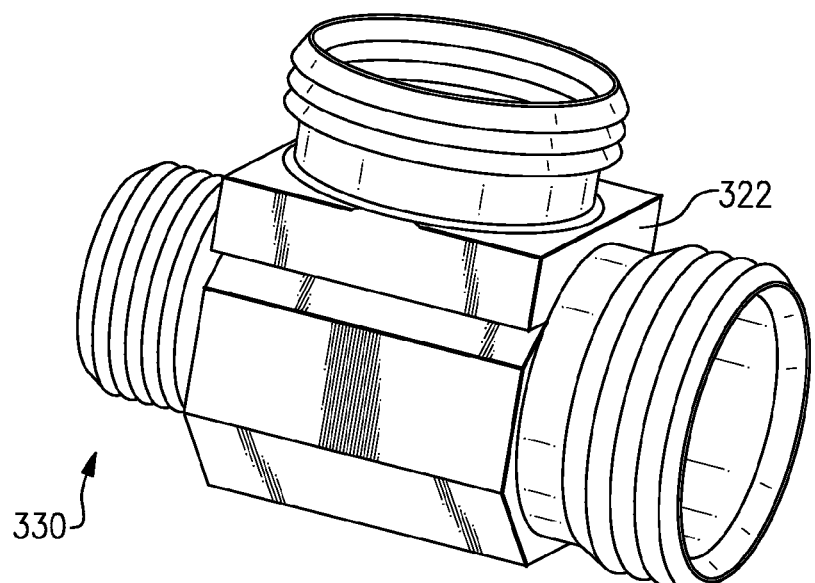
FIG. 7 shows a perspective view of another example plumbing fixture.
Figure 8:
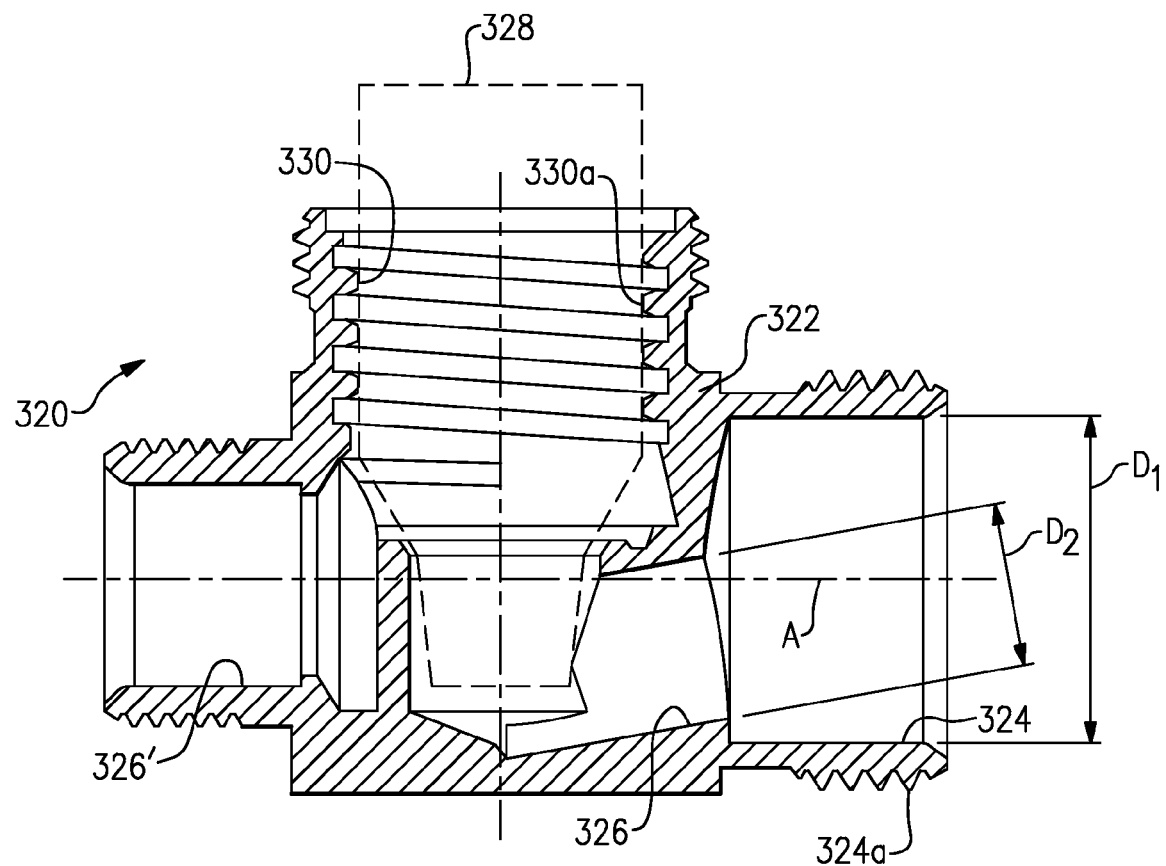
FIG. 8 shows a cross-sectional view of the plumbing fixture shown in FIG. 7.

FIG. 7 shows a perspective view of another embodiment of a plumbing fixture 320, and FIG. 8 shows a cross-sectional view of the plumbing fixture 320 shown in FIG. 7. In this example, the plumbing fixture 320 includes a plumbing fixture body 322 that has a first opening 324 and a second opening 326 that are arranged to communicate a fluid there between. A valve member 328 (shown schematically) is arranged within the plumbing fixture body 322 to control fluid flow between the first opening 324 and the second opening 326. The valve member 328 extends through a third opening 330 in the plumbing fixture body 322. The third opening 330 is not used to communicate fluid, but rather houses a portion of the valve member 328.

The first opening 324 defines a first inner diameter $D_1$ and the second opening 326 defines a second inner diameter $D_2$ such that a ratio of $D_1/D_2$ (the first inner diameter divided by the second inner diameter) is 1.05-2.3 or is within one of the other disclosed ranges described above.

In the illustrated arrangement, the first opening 324 is non-coaxial with the second opening 326. The second opening 326 is non-coaxial with the third opening 330, and the first opening 324 is non-coaxial with the third opening 330. In operation, flow into and out of the plumbing fixture 320 is effectively straight with regard to flow into the first opening 324 and flow out of another second opening 326' that is coaxial with the first opening 324.

In this example, the first opening 324 has a threaded outer diameter 324a. The third opening 330 has a threaded inner diameter 330a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A plumbing fixture comprising:
a plumbing fixture body including a composition by weight percentage of:
58-63 of copper,
0.8-1.5 of bismuth,
0.05-0.15 of phosphorous, and
a remainder of zinc and any impurities,
the plumbing fixture body including a first opening and a second opening arranged to communicate a fluid there through, the first opening defining a first inner diameter $D_1$ and the second opening defining a second inner diameter $D_2$ such that a ratio of $D_1/D_2$ ($D_1$ divided by $D_2$) is 1.05-2.3.

2. The plumbing fixture as recited in claim 1, wherein at least one of the first opening or the second opening has a threaded outer diameter.

3. The plumbing fixture as recited in claim 1, wherein at least one of the first opening or the second opening has a threaded inner diameter.

4. The plumbing fixture as recited in claim 1, including a valve member within the plumbing fixture body, the valve member being operable to control communication of fluid between the first opening the second opening.

5. The plumbing fixture as recited in claim 1, wherein the ratio is 1.1-2.1.

6. The plumbing fixture as recited in claim 5, wherein the ratio is 1.62-1.65.

7. The plumbing fixture as recited in claim 1, wherein the ratio is 1.05-1.6.

8. The plumbing fixture as recited in claim 7, wherein the ratio is 1.08-1.10.

9. The plumbing fixture as recited in claim 1, wherein the first opening and the second opening are non-coaxially arranged.

10. The plumbing fixture as recited in claim 1, wherein the first opening and the second opening are coaxially arranged.

11. The plumbing fixture as recited in claim 1, wherein the plumbing fixture body includes a third opening having a valve actuator located therein.

12. The plumbing fixture as recited in claim 11, wherein the third opening is coaxially arranged with the first opening and non-coaxially arranged with the second opening.

13. The plumbing fixture as recited in claim 11, wherein the third opening defines an inner diameter $D_3$ that is non-equivalent to the first inner diameter $D_1$ and the second inner diameter $D_2$.

* * * * *